United States Patent

Mattingly

[11] Patent Number: 5,713,623
[45] Date of Patent: Feb. 3, 1998

[54] MOTION DAMPENER

[75] Inventor: Robert L. Mattingly, Holland, Mich.

[73] Assignee: Prince Corporation, Holland, Mich.

[21] Appl. No.: 584,554

[22] Filed: Jan. 11, 1996

[51] Int. Cl.[6] ............................................. B60R 7/04
[52] U.S. Cl. ........................ 296/37.7; 296/37.8; 16/337; 188/83
[58] Field of Search ................... 296/37.1, 37.7, 296/37.8, 37.9, 37.12, 37.13; 188/83, 268; 49/138; 16/337, 341; 267/134, 153; 428/343

[56] References Cited

U.S. PATENT DOCUMENTS

| | | |
|---|---|---|
| 290,839 | 12/1883 | Blair . |
| 399,751 | 3/1889 | Haines . |
| 1,171,773 | 2/1916 | Crane . |
| 1,791,691 | 2/1931 | Stevens . |
| 1,863,884 | 6/1932 | Schnell et al. . |
| 1,986,744 | 1/1935 | Muxworthy . |
| 1,999,970 | 4/1935 | Visser . |
| 2,449,965 | 9/1948 | Bell . |
| 2,613,093 | 10/1952 | Foresman . |
| 2,677,483 | 5/1954 | Shaw . |
| 2,711,556 | 6/1955 | Magnuson . |
| 2,798,632 | 7/1957 | Holly et al. . |
| 3,034,597 | 5/1962 | Arnold et al. . |
| 3,146,487 | 9/1964 | Johnson et al. . |
| 3,362,504 | 1/1968 | Maldarelli . |
| 3,584,333 | 6/1971 | Hakala . |
| 4,017,939 | 4/1977 | Schofield . |
| 4,415,069 | 11/1983 | Eisemann . |
| 4,436,351 | 3/1984 | Kitrell . |
| 4,485,524 | 12/1984 | Neville . |
| 4,628,568 | 12/1986 | Lee et al. . |
| 4,658,547 | 4/1987 | Oboza . |
| 4,692,960 | 9/1987 | Jozefczak . |
| 5,050,922 | 9/1991 | Falcoff . |
| 5,178,481 | 1/1993 | Kawamura . |
| 5,183,137 | 2/1993 | Siwek et al. ............... 188/381 |
| 5,403,058 | 4/1995 | Fischer . |
| 5,413,317 | 5/1995 | Spoerre . |
| 5,522,638 | 6/1996 | Falcoff et al. ............ 296/37.8 |
| 5,542,508 | 8/1996 | Van Erden et al. ......... 188/130 |

*Primary Examiner*—Dean Kramer
*Attorney, Agent, or Firm*—Price, Heneveld, Cooper, DeWitt & Litton

[57] ABSTRACT

A generally planar resilient polymeric member having a viscous film is positioned between a fixed and movable element of the vehicle accessory and provides controlled friction between the two. In a preferred embodiment of the invention, the fixed member is a housing for a vehicle storage compartment and the movable member is a pivoted door. The dampening device has one side secured to either the door or the housing and an opposite surface including a viscous material. The device is compressibly fitted between the fixed and movable member for providing a frictional interface therebetween.

31 Claims, 2 Drawing Sheets

MOTION DAMPENER

BACKGROUND OF THE INVENTION

The present invention relates to a motion dampener and one particularly suitable for use in the automotive environment.

Vehicles, such as automobiles, vans and sport utility vehicles, frequently include a variety of convenient storage areas such as covered storage compartments for relatively small items such as sunglasses, garage door openers, or other items. Often these storage compartments are integrated into an overhead console such that storage doors, when released from a snapped closed position, drop downwardly. In order to control the motion of such storage compartments, dampening devices have been incorporated into the pivot-mounted doors to provide a controlled, smoothly-operating opening action. U.S. Pat. Nos. 5,403,058, 5,413,317 and 5,211,267 disclose dampening devices of the prior art associated with such storage compartments. Although these dampening devices provide the desired control, the devices themselves require either a rotary dampening mechanism or other specific structure which adds to the expense of the vehicle accessory in a highly cost competitive environment.

SUMMARY OF THE PRESENT INVENTION

The dampening system of the present invention provides the desired dampening action by utilizing a generally planar resilient polymeric member having a viscous film interface between a fixed and movable element of the vehicle accessory to provide controlled friction between the two and thereby provide the desired dampening. In a preferred embodiment of the invention, the fixed member is a housing for a vehicle storage compartment and the movable member is a pivoted door. The dampening device has one side secured to either the door or the housing and an opposite surface frictionally engaging the other of the door or housing. The device is compressibly fitted between the fixed and movable member for providing the frictional interface therebetween.

In one embodiment of the invention, the resilient member comprises a planar pad of thermoplastic elastomer material having a lubricous surface film. In a preferred embodiment, the film is coated with a silicone based lubricant for providing the desired dampening between the fixed and movable members. Also, the surface to which the lubricant is applied includes a plurality of apertures and/or indentations defining reservoirs for such lubricant. The resilient pad may include a self-adhering adhesive on the side opposite of that of the lubricous film to fixedly mount the pad to one of the movable or fixed members.

As a result, the dampener of the present invention provides a relatively inexpensive structure which provides the desired dampening action without the need for separately manufactured rotary dampers or other control members of the prior art and thereby significantly reducing the cost and complexity of the system while providing the same desired reliability in the automotive environment.

These and other features, objects and advantages of the present invention will become apparent upon reading the following description thereof together with reference to the accompanying drawings.

DETAILED DESCRIPTION OF THE PREFERRED EMBODIMENT

Figure 1:
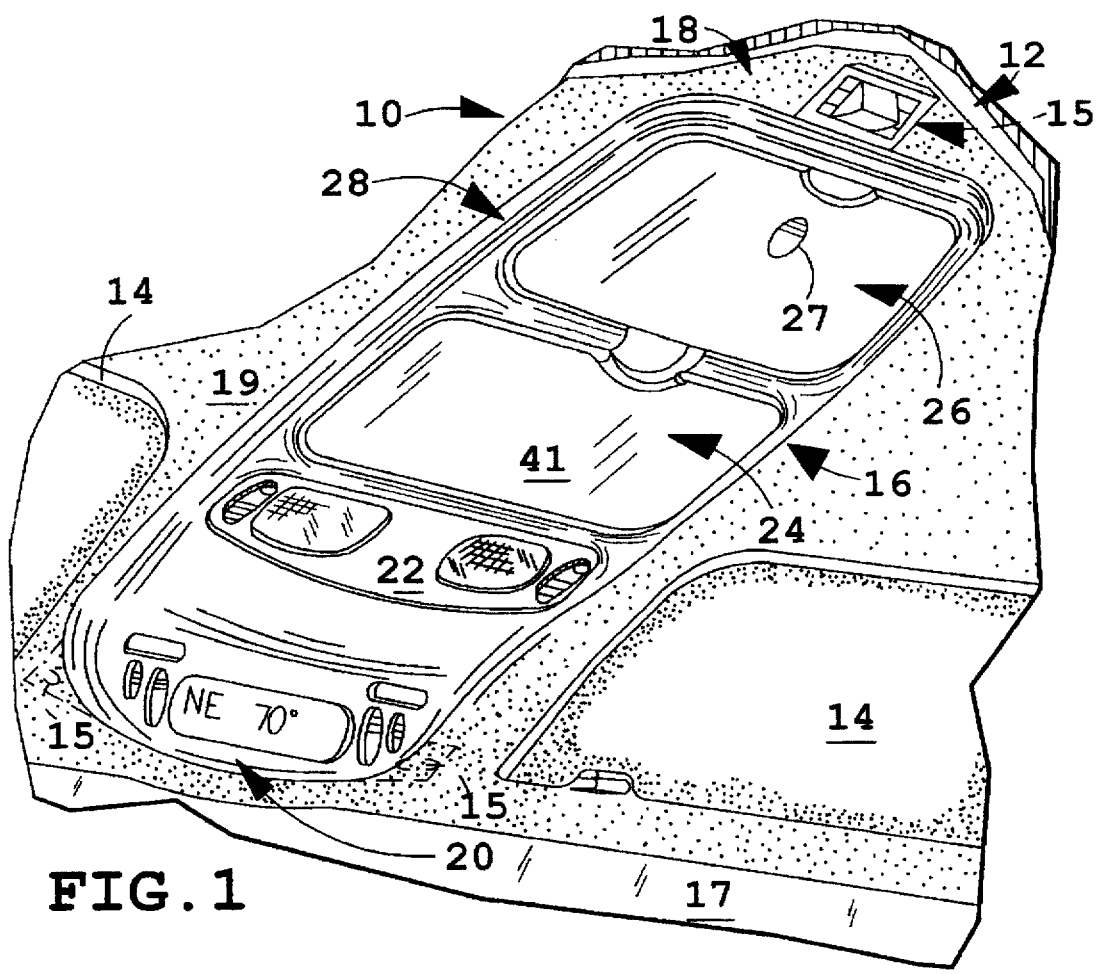
FIG. 1 is a fragmentary, perspective view of an interior of a vehicle with an overhead console having storage compartments embodying the dampening structure of the present invention.

Referring initially to FIG. 1, there is shown a vehicle 10, such as an automobile, which includes a sheet metal roof 12 and various support beams underlying the roof which are employed for holding a variety of vehicle accessories, such as visors 14 and an overhead console 16. Covering the sheet metal roof 12 and support structure associated therewith is a headliner 18 which is molded of suitable composite material covered by an upholstery fabric 19 to conform to the interior of the vehicle.

Figure 2:
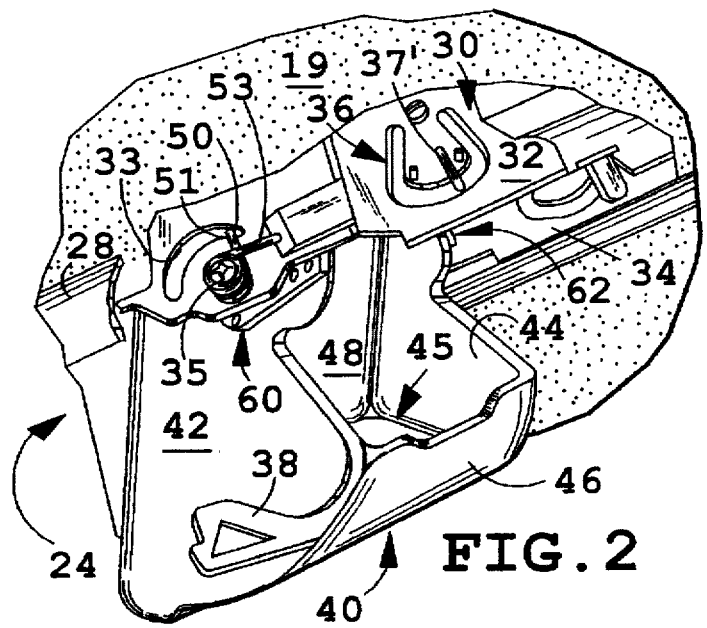
FIG. 2 is a fragmentary, perspective view of one of the storage housings shown in FIG. 1 with a pair of the dampening devices of the present invention mounted thereto.

The visors 14 are mounted above the windshield 17 of the vehicle in a conventional manner, while console 16 is mounted to the roof 12 using, in part, snap-in fasteners 15 as described in U.S. patent application Ser. No. 08/472,331 filed on Jun. 7, 1995, now U.S. Pat No. 5,636,891, and entitled ADJUSTABLE FASTENER. Console 16 may include a digital electronic compass 20 of the type described in U.S. Pat. No. 4,953,305. This compass provides a digital readout of the vehicle's direction as well as the ambient temperature. Console 16 may also include a map lamp subassembly 22 providing light directable to either the driver or passenger side, a sunglass storage compartment 24 and a garage door opening storage compartment 26 having an actuator panel 27 for actuating a conventional garage door transmitter mounted within the storage compartment. The console 16 and its components are mounted within a housing 28 utilizing conventional snap-in integrally molded tabs and mating slots or other conventional fastening techniques to easily install the console subassemblies to housing 28. The storage compartments 24 and 26 may include one or more dampening devices of the present invention with sunglass storage compartment 24 being shown in detail in FIG. 2, now described.

The storage compartment 24 is one particularly adapted for the storage of sunglasses and includes its own generally rectangular housing 30 mounted within the console housing 28 in a conventional fashion. Housing 30 includes generally vertically extending sidewalls 32 and 34, each having relatively flat facing interior surfaces surrounding pivot axles 35 for pivotally mounting the storage cover 40 within housing 30. Housing 30 also includes a floor 37 (FIG. 3) and front and rear walls (not shown). The left sidewall 32 of the structure includes a race track type latch 36 of conventional construction which includes a movable latching lever 37' which extends within a raceway 38 on the sidewall 42 of the storage door 40 which includes an opposite sidewall 44, a curved front wall 46 defining a sunglass storage receiving pocket 45 therein together with a rear wall 48. Pivot axle 35 (and a similar pivot axle through wall 44) pivotally mount the storage cover 40 to housing 30. A coil spring 50 has a first end 51 anchored within an aperture in wall 42 of cover 40 and an opposite end 53 anchored to wall 32 of housing 30. End 51 extends through an arcuate slot 33 in wall 32 such that when the cover is raised to the closed position shown in FIG. 1, the spring 50 urges the storage door 40 to an open position when the push-push latch 36 is activated by the depression of the outer surface 41 (FIG. 1) of the rear wall 48 of the storage compartment.

Without the dampening structure of the present invention, the cover would uncontrollably drop downwardly, possibly spilling the contents of the storage pocket 45 therefrom. In order to provide the controlled, smooth operating lowering of the storage door 40, the dampening devices 60, 62 of the present invention are positioned between the outer surfaces 42 and 44 of the end walls of the storage door 40 and the inner surfaces of sidewalls 32, 34, respectively, of the housing 30 for the storage compartment. The storage door 40 in the preferred embodiment includes a dampening device 60 and 62 on each of the sides, although in some applications only one such dampening device may be necessary. In the preferred embodiment, however, one is used in association with each of the pivot connections of the storage cover to the housing and are substantially identical with dampening device 60 being shown in detail in connection with FIGS. 3–4 and now described.

Figure 3:
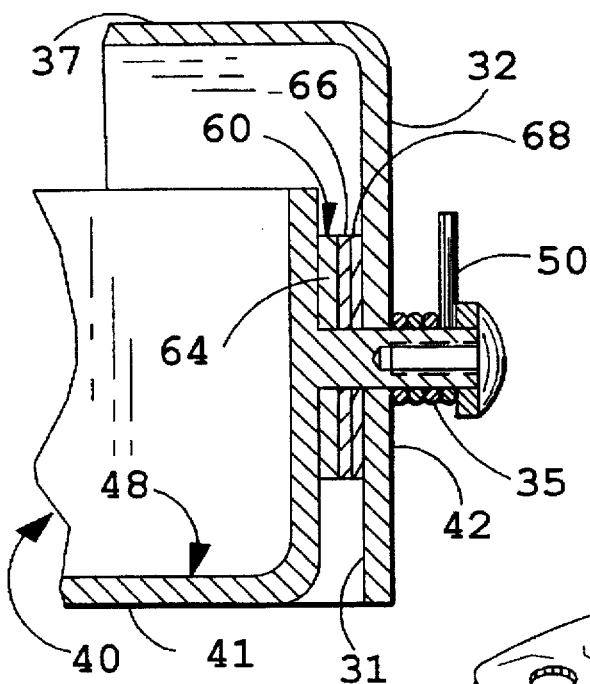
FIG. 3 is a fragmentary, vertical, cross-sectional view of one of the dampening devices of the present invention shown with the storage cover in a closed position.

As seen in FIG. 3 initially, the dampening device 60 is interposed between the outer surface of wall 42 associated with storage cover 40 and the inner surface 31 of sidewall 32 and surrounds the pivot axle 35 which can be integrally molded with the storage door 40 or otherwise attached to sidewall 42 thereof. The dampening device 60 is compressibly fitted between the facing surfaces and is secured in the preferred embodiment to sidewall 42 by means of a self-sticking adhesive layer 61 (FIG. 4) secured to the resilient polymeric substrate 64. Adhesive layer 61 may include, prior to installation, a strip-away paper backing to protect the adhesive layer until installed on the cover 40. The substrate 64 has, in the preferred embodiment of the invention, a thickness of approximately 0.062 inches and is made of a thermoplastic elastomer such as Poron®. Covering the opposite surface 63 of the substrate 64 is a layer of lubricous film 66 which can be a high density urethane film suitably bonded to the surface 63 of the substrate 64. Film layer 66 can be adhered to surface 63 in a conventional manner and is overlaid by a second film 68 having a plurality of circular apertures 69 formed therethrough at spaced intervals for defining lubricant receptacles for a lubricous silicon-based dampening grease, such as that commercially available from Nye Lubricants of New Bedford, Mass. The grease 70 is applied as a film to the outer surface 71 of film layer 68 and within apertures 69 to be captured therein. An aperture 72 extends through the sandwiched structure of the viscous dampener so formed to index the dampener device around pivot axle 35 in an appropriate position during installation. The lubricant preferably has a viscosity of from about 35,000 centistokes to about 45,000 centistokes at 20° C.

The apertures 69, which extend only through the film layer 68, hold the lubricant during the life of the dampening device. The apertures 69 have a diameter of about 3.5 mm and are spaced at about 8 mm centers over the surface of the generally pie-shaped dampening device 60. The film layers have a thickness of approximately 0.013 inches, although different thicknesses can be employed and the thicker the outer film becomes, the larger the reservoir for the lubricant 70 becomes. The desired dampening action, due to the frictional interface between the outer surface of layer 68 and the inner surface of wall 32 of the housing and the corresponding dampening interconnection on the opposite side, can be varied as desired for a given storage compartment or other relative movable parts in the vehicle. Thus, the compression or preload thickness can be varied by, for example, varying the thickness of the substrate for a given space between the fixed and movable members. Thus, the Poron® thickness can be increased to provide more compression, therefore, increasing the frictional force and the dampening action. Further, the surface area can be increased to also increase the dampening action as will a change in the viscosity of the grease. Thus, for a given installation, these factors can be varied to provide the desired dampening. For the sunglass storage case shown, the dampeners 60 and 62 were compressed by a force of about 7 pounds during installation to provide the desired dampening action.

Figure 4:
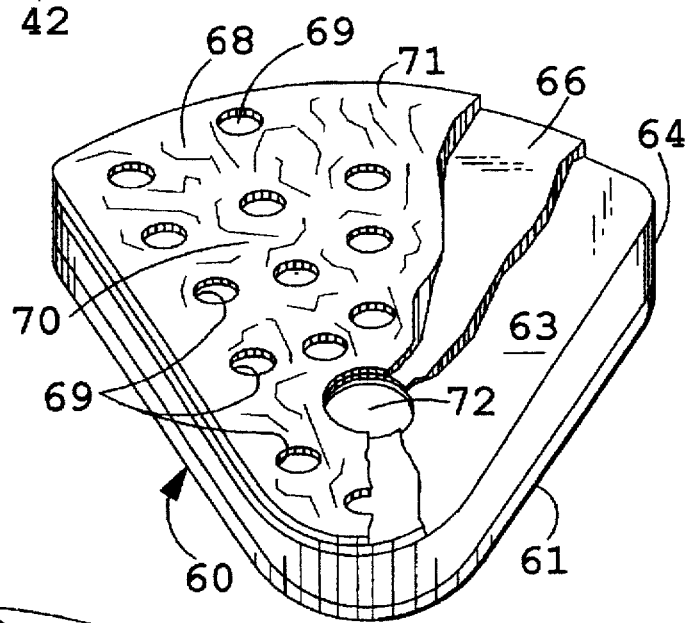
FIG. 4 is an enlarged fragmentary, perspective, partly broken away view of one of the dampening devices embodying the present invention.
Figure 5:
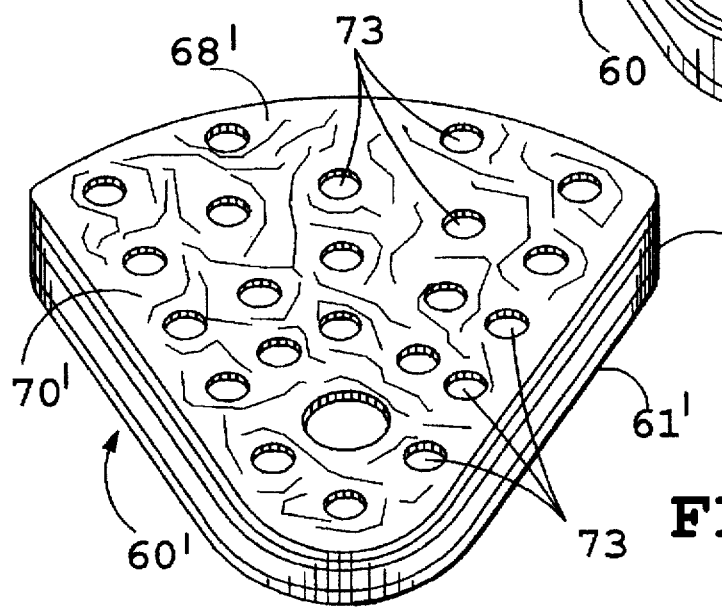
FIG. 5 is an enlarged perspective view of an alternative embodiment of the dampening device of the present invention.

In an alternative embodiment of the dampener shown in FIG. 5, similar numbers are employed for the same parts with the superscript prime symbol (') being employed. In FIG. 5, the dampener 60' includes an upper film layer 68' into which there are formed hemispherical dimples 73 which, like apertures 69 in the FIG. 4 embodiment, are spaced around the outer surface of film 68' uniformly to provide receptacles for the silicon-based lubricant. The dimples 73 can be heat formed into the combined film 68' and underlying substrate 64' by utilizing a heated pressing process with a suitable die.

The dampening members shown in FIGS. 4 and 5 typically will be manufactured in sheets with the various films adhered to the substrate and the shape of the dampener then die cut into the desired final configuration. In the embodiment shown for the pivot down storage cover, the pie-shaped dampening device is preferable, although other shapes, such as circular, arcuate or the like, can also be employed. The dampener is typically fixedly adhered to one of the surfaces, either 42 of the door or the inner surface 31 of wall 32 of the storage compartment with one of the surfaces remaining free to slide along the outer surface 68 of the dampener. Once the dampener is rigidly applied to one of the two surfaces of the interfacing members, the silicon grease is applied to the remaining exposed outer surface and the assembly completed. Housing 30, like door 40, is typically made of a molded polymeric material, and its walls can be deflected sufficiently to allow the compression fit of the dampening devices around the pivot axles and between the sidewalls of the housing and the outer sidewalls of the storage door.

As seen, therefore, by the dampening structure of the present invention, a relatively inexpensive and yet effective dampening structure is provided which reduces the cost of manufacturing significantly and yet provides the desired controlled motion between two moving parts in the automotive environment. It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A vehicle accessory and dampening device comprising:

a first member having a surface;

a second member movably mounted to said first member and including a surface facing said surface of said first member; and a dampening device comprising a substantially planar member of resilient polymeric material compressively extending between said surfaces of said first and second members and having a first surface adhesively secured to one of said surfaces of said first and second members and an opposite surface having a lubricous film engaging the other of said surfaces of said first and second member to dampen the motion between said first and second members.

2. The apparatus as defined in claim 1 wherein said lubricous film comprises a high density urethane film adhesively secured to said resilient polymeric material.

3. The apparatus as defined in claim 2 wherein said lubricous film further includes a lubricant.

4. The apparatus as defined in claim 3 wherein said lubricant is a silicon-based grease having a viscosity of from about 35,000 centistokes to about 45,000 centistokes at 20° C.

5. The apparatus as defined in claim 4 wherein said resilient polymeric material includes a self-sticking adhesive film on a side opposite said lubricous film.

6. The apparatus as defined in claim 5 wherein said first member comprises a storage housing and said second member comprises a cover for said storage housing and wherein said dampening device is interposed between said housing and said cover.

7. The apparatus as defined in claim 6 wherein said cover is pivotally mounted to said housing.

8. The apparatus as defined in claim 7 wherein said dampening device includes an aperture surrounding a pivot axle coupling said cover to said housing.

9. The apparatus as defined in claim 8 wherein said resilient polymeric material comprises a thermoformed elastomer.

10. The apparatus as defined in claim 9 wherein said resilient polymeric material comprises Poron®.

11. The apparatus as defined in claim 1 wherein said lubricous film includes a plurality of receptacles for a lubricant and further including a lubricant applied to said lubricous film.

12. The apparatus as defined in claim 11 wherein said lubricous film further includes an outer layer of polymeric film and said receptacles comprise a plurality of spaced apertures formed in said outer layer.

13. The apparatus as defined in claim 12 wherein said apertures have a diameter of about 3.5 mm and are spaced at intervals of about 8 mm.

14. The apparatus as defined in claim 11 wherein said lubricant is a silicon-based grease having a viscosity of from about 35,000 centistokes to about 45,000 centistokes at 20° C.

15. The apparatus as defined in claim 11 wherein said receptacles comprise a plurality of spaced dimples formed in said lubricous film.

16. The apparatus as defined in claim 15 wherein said dimples are generally hemispherical.

17. The apparatus as defined in claim 16 wherein said lubricant is a silicon-based grease having a viscosity of from about 35,000 centistokes to about 45,000 centistokes at 20° C.

18. A vehicle storage compartment and dampening device comprising:

a housing having a pair of spaced sidewalls with substantially flat surface sections;

a cover pivotally mounted to said housing with a pivot axle extending between said housing and said cover adjacent said flat surface sections; and at least one dampening device comprising a substantially planar member extending between said housing and cover and having an aperture surrounding a pivot axle wherein one side of said planar member is adhesively secured to said cover and an opposite side has a lubricous film engaging said flat surface section of said housing to provide dampening of the motion between said cover and said housing.

19. The apparatus as defined in claim 18 wherein said planar member comprises a resilient polymeric material which is compressibly fitted between said cover and housing.

20. The apparatus as defined in claim 19 wherein said lubricous film comprises a high density urethane film adhesively secured to said resilient polymeric material.

21. The apparatus as defined in claim 20 wherein said lubricous film further includes a lubricant.

22. The apparatus as defined in claim 21 wherein said lubricant is a silicon-based grease having a viscosity of from about 35,000 centistokes to about 45,000 centistokes at 20° C.

23. The apparatus as defined in claim 22 wherein said resilient polymeric material includes a self-sticking adhesive film on a side opposite said lubricous film.

24. The apparatus as defined in claim 18 and further including a dampening device mounted to said cover on a side opposite said first named dampening device.

25. A vehicle dampening device comprising:

a substantially planar member of resilient polymeric material having a thickness selected to be compressively extended between surfaces of first and second members which move in relation to one another, wherein said planar member has a first surface with a self-sticking adhesive layer and an opposite surface having a polymeric film having receptacles for receiving a lubricant; and a lubricant applied to said opposite surface.

26. The apparatus as defined in claim 25 wherein said resilient polymeric material comprises a thermoformed elastomer.

27. The apparatus as defined in claim 25 and further including a second layer of polymeric film attached to said first layer and wherein said receptacles comprise a plurality of spaced-apart apertures formed through said second layer of polymeric film.

28. The apparatus as defined in claim 25 wherein said receptacles comprise a plurality of spaced dimples formed in said polymeric film.

29. The apparatus as defined in claim 25 wherein said lubricant is a silicon-based grease having a viscosity of from about 35,000 centistokes to about 45,000 centistokes at 20° C.

30. The apparatus as defined in claim 29 wherein said resilient polymeric material comprises a thermoformed elastomer.

31. The apparatus as defined in claim 30 wherein said resilient polymeric material comprises Poron®.

* * * * *